Oct. 11, 1932.  W. O. ISAACSON  1,881,615
COOKING UTENSIL
Filed April 17, 1930

William O. Isaacson,
Inventor.
Delos G. Haynes
Attorney

Patented Oct. 11, 1932

1,881,615

UNITED STATES PATENT OFFICE

WILLIAM O. ISAACSON, OF CHICAGO, ILLINOIS

COOKING UTENSIL

Application filed April 17, 1930. Serial No. 444,897.

This invention relates to cooking utensils and with regard to certain more specific features, to frying pans.

Among the objects of the invention may be noted the provision of a frying pan adapted both for use with thin-sliced articles and the like, such as bacon, which will prevent curling of the frying article, and which is also adapted for the frying of articles which are not flat or sliced, such as chicken, potatoes and the like; the provision of means of the class described which provides for an even cooking of the material to be fried, and which cooks said material without evaporating the greater part of the grease content; and provision of means of the class described adapted to increase the efficiency of heating, and effect economical use of fuel. Other objects will be in part obvious and in part pointed out hereinafter.

The invention accordingly comprises the elements and combinations of elements, features of construction, and arrangements of parts, steps and sequence of steps, which will be exemplified in the structure hereinafter described, and the scope of the application of which will be indicated in the following claim.

In the accompanying drawing, in which is illustrated one of various possible embodiments of the invention, Fig. 1 is a top plan view of the invention in one position;

Similar reference characters indicate corresponding parts throughout the several views of the drawing.

In the process of frying thin-sliced meats, such as bacon, ham and the like, it is desirable to prevent the meat from over much curling, inasmuch as such curling results in uneven cooking, frying and/or baking of the meat. The curled meat touches the hot frying pan in a few places only; these places become over crisp while the rest of the meat remains relatively uncooked. It is ordinarily impossible to keep such thin-sliced meats from this curling in an open frying pan.

It has been proposed to place permanently attached weights in a frying pan in order to overcome this difficulty. The present invention provides a means for keeping thin meats and the like flat on the bottom of the pan, and at the same time serves as a lid for the pan which may be positioned as an ordinary lid to permit deep frying, or frying of articles wherein it is not necessary to maintain such articles flat on the bottom of the pan.

Figure 1:
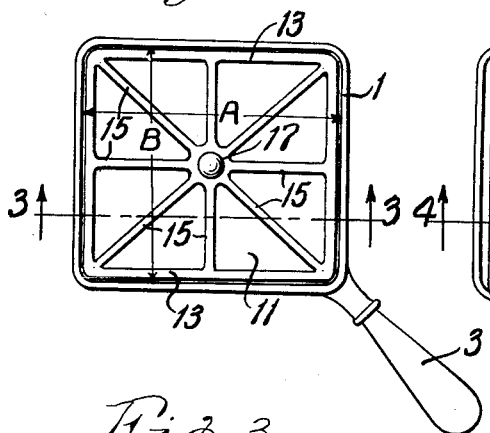
Figure 5:
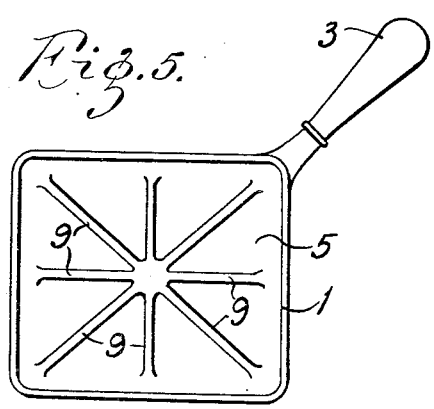
Fig. 5 is a bottom plan view of the invention.

Referring now more particularly to Fig. 1, there is illustrated at numeral 1 a frying pan, having a handle 3. It will be noted that the pan 1 is slightly rectangular, the dimension "A" being a little greater than the dimension "B". The frying pan 1 has a raised bottom portion 5 (see Fig. 3), thereby providing a recess 7 in the bottom of the frying pan. The under side of the bottom 5 is provided with radiating ribs or ridges 9 (see also Fig. 5). The recess 7 and the ribs 9 cooperate to effect a heat economy, and to secure uniform heating of the bottom 5 of the pan 1. This aids in proper cooking.

Fitted removably into the top or cooking portion of the frying pan 1, in Fig. 1, is a lid 11. The lid 11 conforms in shape to the frying pan 1, and is therefore somewhat rectangular. The lid 11 is stampd or otherwise formed around the outer edge thereof and offset rim 13. Radiating ribs 15 are also formed in the lid 11. A handle 17 is provided for said lid 11.

Figure 2:
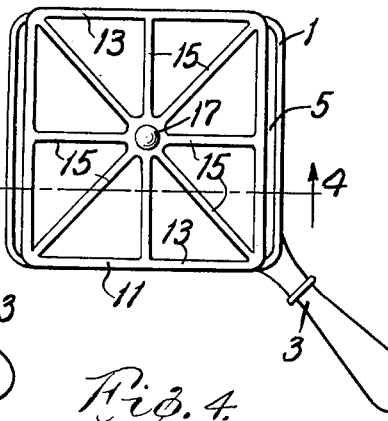
Fig. 2 is a view similar to Fig. 1 of the invention in a second position.
Figure 3:
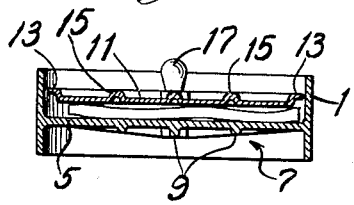
Fig. 3 is a vertical cross section taken on line 3—3 of Fig. 1.
Figure 4:
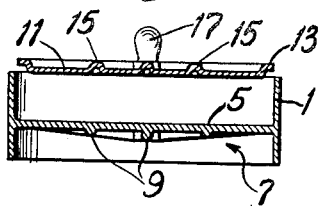
Fig. 4 is a vertical section taken on line 4—4 of Fig. 2.

It will be seen that when the lid 11 is in the Fig. 1 position, it will sink into the frying pan 1 as in Fig. 3, and will form an effective weight for holding thin-sliced meats flat as described hereinbefore. If, however, the lid 11 is removed from the Fig. 1 position, and rotated through 90° to the Fig. 2 position, it will be seen that the lid 11 will rest upon the edges of the frying pan and will not sink therein. In this Fig. 2 position, the lid 11 performs the functions of an ordinary cooking utensil lid. Because of the near equality of the dimensions "A" and "B", the lid 11 in the Fig. 2 position does not leave appreciable openings, if any, on its sides.

The ribs or beads 15 constitute channels and permit the disposition of steam, vapors and the like engendered during cooking, from the center of the frying pan to the outer edges. These ribs are particularly valuable when the lid is used as a weight in the Fig. 1 position. By facilitating the removal of vapors and the like, danger of these vapors unseating and raising the lid 11, and thereby reducing the beneficial effect of said lid, is eliminated.

The ribs or beads or grooves 15 also serve to strengthen or stiffen the lid 11, which is desirably made of relatively light metal.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

In combination, a frying pan having a raised bottom, heat conducting ridges on the under side of said bottom, and a removable lid for said frying pan, said lid having therein radiating vapor conducting beads, said lid being adapted to fit into said frying pan in one position and to rest on the top of said frying pan in a second position.

In testimony whereof, I have signed my name to this specification this 11th day of April, 1930.

WILLIAM O. ISAACSON.